United States Patent [19]

Shibley

[11] Patent Number: 5,238,579
[45] Date of Patent: Aug. 24, 1993

[54] METHOD FOR GENERATING COARSE PRECIPITATES FROM SOLUTIONS OR SLURRIES CONTAINING IONIC SPECIES

[75] Inventor: Paul W. M. Shibley, South Surrey, Canada

[73] Assignees: Falconbridge Limited, Toronto; Paul Shibley and Associates, Ltd., South Surrey, both of Canada

[21] Appl. No.: 983,024

[22] Filed: Nov. 30, 1992

Related U.S. Application Data

[63] Continuation-in-part of Ser. No. 757,622, Sep. 11, 1991, abandoned.

[30] Foreign Application Priority Data

Sep. 12, 1990 [CA] Canada .................................. 2025210

[51] Int. Cl.$^5$ ............................. C02F 1/56; C02F 1/58; C02F 1/62
[52] U.S. Cl. .................................... 210/716; 210/727; 210/728; 210/734; 210/906; 210/912; 210/738
[58] Field of Search ............... 210/723, 734, 912, 906, 210/907, 726, 727, 728, 738, 716

[56] References Cited

U.S. PATENT DOCUMENTS

| | | | |
|---|---|---|---|
| 3,855,125 | 12/1974 | Lin ........................................ | 210/716 |
| 4,711,727 | 12/1987 | Matthews et al. ................... | 210/727 |
| 4,849,128 | 7/1989 | Timmons et al. .................... | 210/728 |
| 4,882,069 | 11/1989 | Pohoreski .......................... | 210/728 |
| 5,073,272 | 12/1991 | O'Neill et al. ...................... | 210/728 |

Primary Examiner—Stanley S. Silverman
Assistant Examiner—Neil M. McCarthy
Attorney, Agent, or Firm—Keck, Mahin & Cate

[57] ABSTRACT

A method is proposed for performing precipitation reactions which yields precipitate particles in the form of flakes. The precipitate particles are coarse, having cross-measurements in the order of 10 to 400 microns. According to this method, a suitable precipitant is one which will react with the ionic species to be precipitated and which is sparingly soluble, such as lime, and therefore capable of forming a slurry as opposed to a solution. Prior to adding the precipitant to the solution containing ions to be precipitated, the precipitant is slurried, normally in aqueous medium, and flocculated such that discrete floccules having diameters in the order of 1 to 6 mm are formed. Upon addition of the flocculated precipitant to the solution containing ions to be precipitated, a layer of precipitate forms on the surface of the precipitant floccules, encapsulating or partially encapsulating the floccule. Under agitation, the coated floccule breaks down releasing flakes of precipitate and exposing fresh surfaces of the precipitant floccule to allow continuation of the reaction. Liquid/solids separation and recovery of the precipitate by sedimentation, filtration or exfiltration is rapid and easy because of the relatively coarse size of the precipitate particles.

14 Claims, 1 Drawing Sheet

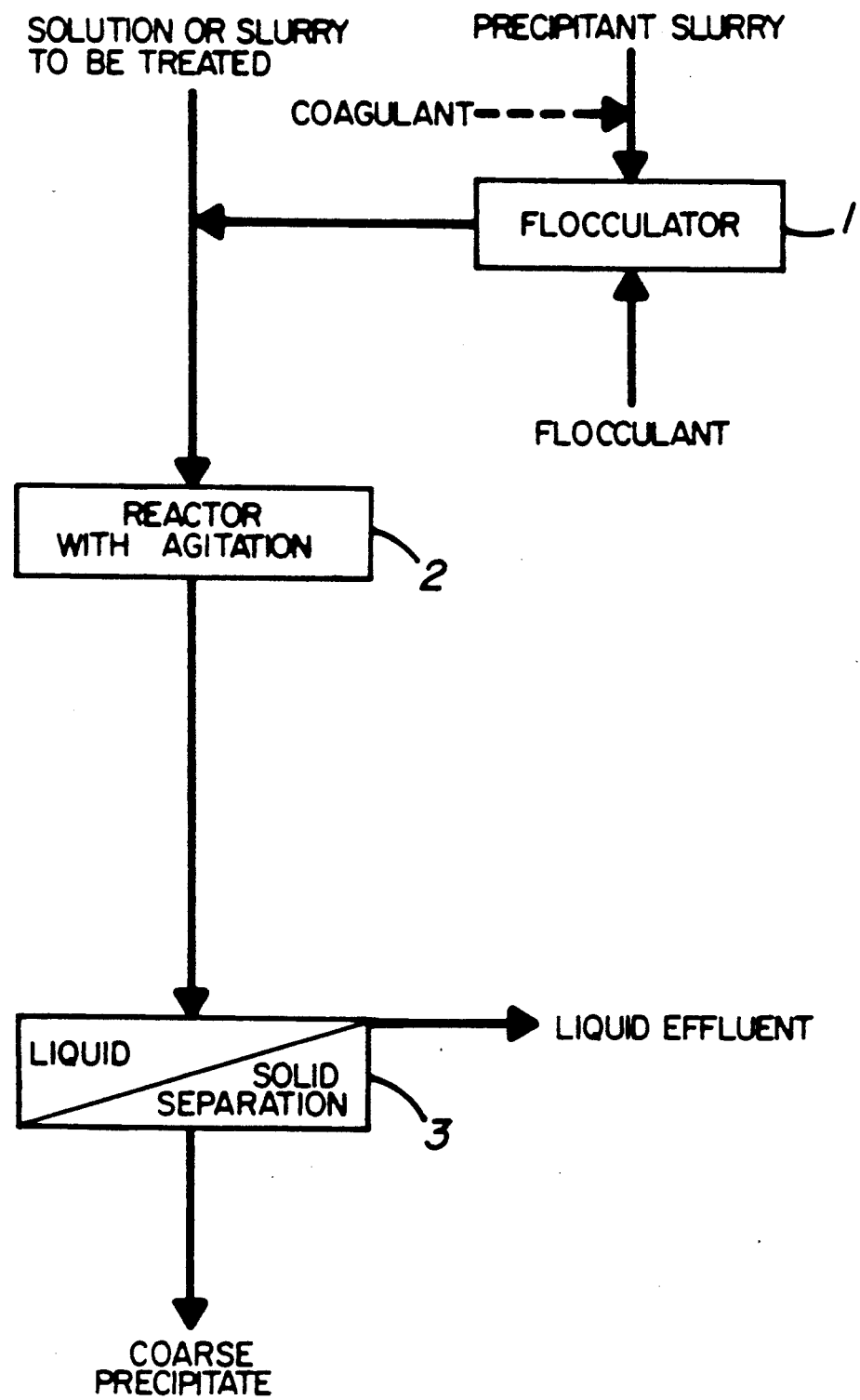

METHOD FOR GENERATING COARSE PRECIPITATES FROM SOLUTIONS OR SLURRIES CONTAINING IONIC SPECIES

This application is a continuation-in-part of application No. 07/757,622 filed Sept. 11, 1991, now abandoned.

This invention relates to the formation of coarse precipitates from solutions or slurries containing ionic species. The precipitate particles are of a size readily dewatered by well known liquid/solid separation techniques such as sedimentation or filtration.

The removal of anions and cations from solution is commonly accomplished by precipitation reactions. For example, iron may be removed from a solution of ferrous sulphate by the addition of NaOH. Ferrous hydroxide, being relatively insoluble, precipitates and can be recovered as solid particles. Similarly, a solution of ferrous sulphate could be treated by the addition of lime, $Ca(OH)_2$. In this case, ferrous hydroxide is again recovered as a precipitate and calcium sulphate, being somewhat insoluble, may co-precipitate, partially removing sulphate ions as well. In these examples, NaOH and lime, $Ca(OH)_2$, are referred to as precipitants.

Typically, the particle size of such precipitates is in the order of 0.5 microns, making them difficult and expensive to de-water. In particular, the metal hydroxides form voluminous, low density sludges which rarely exceed 2 percent solids under gravitational settling. Various precipitate recycle techniques have been developed to improve the dewatering characteristics and increase sludge density. However, these systems have the disadvantage of large recycle requirements and large thickener/clarifier requirements which are expensive and cumbersome.

It is well known that in practice, the use of relatively insoluble precipitants such as lime is more difficult than the use of more soluble precipitants such as NaOH. The more soluble precipitants dissolve rapidly and react stoichiometrically with the ions to be precipitated. Precipitants such as lime dissolve slowly enough that precipitates may form on the surface of the lime particle where the concentration of dissolved lime is the highest. The result is an encapsulation consisting of a lime core surrounded by precipitate. Such particles are much larger than precipitate particles alone and can be readily de-watered. However, this effect is rarely exploited because the lime core is wasted, being unavailable for further precipitation reaction. The expensive waste of the precipitant cannot usually be tolerated. For this reason, precipitants such as lime are usually ground very fine and slurried with water prior to use. In this form, lime closely approximates the consumption efficiency of more soluble precipitants such as NaOH.

The object of the present invention is to capitalize on the encapsulation phenomenon while preserving the stoichiometric consumption of precipitant. Applicant has found that if, for example, a finely ground lime slurry is preflocculated before addition, the precipitate forms in a thin layer on the surface of the floccule. That is, the floccule becomes encapsulated in the same manner as the single particle of lime. But unlike the single particle of lime which has physical integrity, the floccule is semi fluid. Under normal agitation, the precipitate skin is not strong enough to maintain the integrity of the encapsulated floccule. It breaks, releasing flakes of precipitate and exposing fresh surfaces of the precipitant floccule for further precipitation. Flakes of precipitate larger than 400 microns have been produced by this method, while the consumption of precipitant has not increased.

The technique is not limited to lime slurries. Other precipitants which can be finely ground, slurried and flocculated include, but are not necessarily limited to, limestone, calcium phosphate and calcium sulphide. The choice depends on the anions and cations to be removed and the desired chemical characteristics of the precipitate.

The spatial relationship of the precipitant and the flocculant is that of any typical floccule. The flocculant causes the lime particles to form more or less homogeneous clusters. The initial surface area of precipitant presented to the solution under treatment is reduced by orders of magnitude, while the apparent size of the precipitant particles, the floccules, is increased by orders of magnitude. The anions and cations in solution, be they acid radicals, metal ions or the like, which would normally be precipitated by the addition of precipitant, are precipitated on the surface of the precipitant floccule, forming the beneficial skin just as the skin would form on a single particle of the precipitant. The difference is that the skin forming around the floccule breaks away as macro-particles rather than being retained as a tenacious barrier.

The flocculant is normally a synthetic polymer, readily available on the market. Examples are identified below:

| Examples of Commercially available Flocculants | | |
|---|---|---|
| Supplier | Trade Name | Supplier's Description |
| Allied Colloids (Canada) Inc. | Percol E10 | - slightly anionic, very high molecular weight copolymer of sodium acrylate and acrylamide |
| | Percol E24 | - anionic, moderately high molecular weight copolymer of sodium acrylate and acrylamide |
| | Percol 358 | - anionic, high molecular weight acrylamide copolymer |
| | Percol 728 | - cationic, very high molecular weight copolymer of quaternary acrylate salt and acrylamide |
| | Percol 776 | - cationic, high molecular weight copolymer of a quaternary acrylate salt (methacrylate) and acrylamide |
| Dearborn Chemical Company Ltd. | Aquafloc 462 | - slightly anionic, high molecular weight polyelectrolyte of sodium salts, polyalkoxylated alcohol and anionic polyacrylamide |
| | Aquafloc 465 | - slightly anionic, high molecular weight polyelectrolyte of sodium salts, alkoxylated alcohol and anionic polyacrylamide |
| | Aquafloc 467 | - highly anionic, high molecular weight synthetic organic polyelectrolyte of sodium salts, alkoxylated alcohol and anionic polyacrylamide |

The above flocculant trade names are, to the best of applicant's knowledge, the property of the companies indicated.

A coagulant could also be used to enhance flocculation of the precipitant. Metal salts, such as iron salts, magnesium salts and the like are suitable and a small quantity, about 1 to 2% by weight relative to the precipitant, is added to the precipitant slurry prior to flocculation with a polymer.

The novel method is particularly suitable for the treatment of solutions or slurries having acid anions of the group $SO_4$, $SO_3$, $CO_3$ and $PO_4$ and metal salts having cations of copper, lead, zinc, iron, calcium, magnesium and the like. Normally, all treated solutions are aqueous solutions of the various anions and cations.

The method in accordance with the present invention comprises:

a) selecting a suitable precipitant for the ions to be precipitated;

b) slurrying the precipitant;

c) flocculating the slurried precipitant, such as hydrated lime, with a flocculant to produce large, discrete floccules having a diameter in the order of 1 to 6 mm;

d) adding the so flocculated precipitant to the solution or slurry to be treated, which contains anions or cations which will react with the precipitant to form precipitates and agitating the same, whereby the precipitant floccules become coated with a layer of precipitate; and e) continuing agitation to break the precipitate floccules which may be partially or completely encapsulated with precipitate, producing flakes of precipitate and exposing fresh precipitant surface, the sequence being repeated until all the precipitant is consumed.

Apart from hydrated lime, the precipitant could be limestone, calcium phosphate, calcium sulphide or any compound which will react with the anions or cations to form precipitates and which is relatively insoluble to form a slurry rather than a solution.

A number of suitable flocculants have been identified above. However, suitable flocculants may be determined experimentally. The objective is to create floccules of precipitant having diameters in the order of 1 to 6 mm, and that is the sole role of the flocculant. The most common commercially available flocculants are polyacrylamides. These are used in the form of dilute aqueous solution of 0.01 to 0.10% by weight in amounts ranging from 50 to 1000 g/ton of precipitant. The flocculant dosage should be optimized for a given reaction. If the flocculant dosage is too large, the precipitant floccules will be stronger and require longer periods of agitation or higher energy agitation to use up all the precipitant during formation of the precipitate. A person skilled in the art will, therefore, optimize the flocculant dosage so as to achieve just the right type of floccule for a particular operation.

The pH of the solution containing ions to be precipitated does not directly affect the generation of coarse particles, except insofar as pH may indicate the relative concentration of ions. In general, the higher the concentration of ions to be precipitated, the better the process works.

Also, the temperature of the solution has little direct effect on the formation of precipitate particles. However, the temperature of the precipitant slurry and the temperature of the flocculant solution can have an important effect on the quantity of flocculant required to flocculate the precipitant. For example, when using polyacrylamides, a three fold increase in flocculant requirements was experienced at temperatures of 2°–3° C. as compared to 15°–20° C.

The size of the precipitate flakes produced depends partly on the size of the precipitant floccules and partly on the intensity of agitation during precipitation. Flakes of 6 mm diameter have been observed and flakes larger than 400 microns are common.

It has also been found that the type of precipitate generated will affect the size and quality of the precipitate flakes. Compact precipitates such as calcium sulphate, calcium carbonate and calcium phosphate form strong flakes. On the other hand, gelatinous precipitates such as metal hydroxides form flakes with diminished physical integrity. Where both compact and gelatinous precipitates are formed together, they combine to form strong flakes in accordance with the method of this invention.

The invention will now be described, by way of example, with reference to the accompanying drawing which represents a schematic diagram of the method in accordance with the present invention.

Referring to the drawing, a slurry of the precipitant such as lime slurry, is introduced into flocculator 1 and, if desired, some coagulant may also be added to this slurry. A suitable amount of flocculant is then introduced to the flocculator 1 where it is intermixed with the precipitant slurry producing floccules of precipitant solids, having diameters in the order of 1 to 6 mm.

The floccules are fed, together with the solution or slurry containing ions to be precipitated, to agitated reactor 2, where the ions in solution to be precipitated make contact with the precipitant ions released by the flocculated precipitant. The precipitant ions are concentrated on the surface of the floccules because the floccules are their source. Precipitation preferentially takes place on the surface of the floccules where the concentration of precipitant ions is the highest. Agitation continues, building and releasing flakes of precipitate from the surface of the floccules. The reactor 2 then discharges to the liquid/solid separation vessel 3 from which the liquid and the flakes of precipitate are separately removed.

The invention will further be described with reference to the following examples:

EXAMPLE 1

A sample of acid mine drainage from New Brunswick, Canada, containing iron, copper, zinc and magnesium sulphates had a lime demand of 8.5 gpl to pH 9.5 This means that it would require 8.5 gpl of lime to neutralize the mine drainage to pH 9.5 from its initial pH of about 2.6, while precipitating the iron, copper, zinc and magnesium as hydroxides. Upon neutralization of 1 liter of such mine drainage with a lime slurry in conventional manner, namely without prior flocculation of the lime, the resulting precipitate of calcium sulphate and metal hydroxide was then flocculated according to common practice with E10 flocculant from Allied Colloids and allowed to settle. After five minutes, the settled volume was 800 ml, giving a settling rate of 0.5 cm/min and a sludge density of 1.7% solids. The precipitate particles were very fine (less than 5 microns).

A second sample of the same mine drainage was neutralized with flocculated lime slurry according to the present invention. A flocculant was used in a form of 0.05% solution of E10 polymer from Allied Colloids which is a high molecular weight, slightly anionic polyacrylamide, which was added to the lime slurry in a dosage of 200 g/ton per lime. Upon neutralization of the mine drainage with this flocculated lime, the resulting precipitate was again flocculated with E10 in conventional manner and allowed to settle. The settled volume after 10 seconds was 200 ml, giving a settling rate of 38 cm/min and a sludge density of 7% solids. The precipitate was made of coarse particles of a size in the order of 35 mesh and filtered easily.

EXAMPLE 2

A Tennessee zinc refinery combined effluent containing zinc and magnesium sulphates had a lime demand of 8 gpl to pH 8.5. Upon neutralization of 1 liter of this effluent with lime slurry in conventional manner, the resulting precipitate of calcium sulphate and metal hydroxide was flocculated with E24 flocculant from Allied Colloids and allowed to settle. After five minutes, the settled volume was 900 ml, at a settling rate of 0.5 cm/min. A fine precipitate of less than 5 microns was obtained.

A second example of the same effluent was neutralized with flocculated lime slurry according to the present invention. A 0.05% solution of flocculant was added to the lime in a dosage of 400 grams per ton of lime. The resulting precipitate was flocculated again in the usual manner with E24 flocculant and allowed to settle. After 30 seconds, the settling volume was 300 ml at a settling rate of 48 cm/min. A coarse precipitate which was easily filtered was obtained.

EXAMPLE 3

To a 1 liter laboratory solution containing 10 gpl $Na_2SO_4$ (pH 8.6) there was added 3.3 g of lime as lime slurry. The resulting precipitate was very fine and settled slowly to about 100 ml after ten minutes.

A second 1 liter sample of the same laboratory solution was treated the same way using flocculated lime slurry according to the present invention. The lime slurry was flocculated with E10 flocculant in a form of 0.05% solution and a dosage of 200 g/ton. The resulting precipitate was made up of large particles which settled to about 30 ml in 1 minute.

EXAMPLE 4

A 1 liter laboratory solution containing 10 gpl $H_2SO_4$ was neutralized with 7 g $CaCO_3$. The resulting precipitate settled to a volume of 200 ml after 10 minutes and to 100 ml after 24 hours. It was formed of fine particles.

The same experiment was repeated using flocculated $CaCO_2$ in accordance with the present invention. The flocculant was E10 in a form of 0.05% solution and a dosage of 200 g/ton. In addition, 1% by weight of $MgSO_4$ was used as coagulant. A precipitate of large particles settled to a volume of 50 ml after only 10 seconds.

EXAMPLE 5

A laboratory slurry containing 300 gpl of −200 mesh sand, 10 gpL $H_2SO_4$ and 5 gpl $FeSO_4.7H_2O$ was neutralized to pH 6.5 with a lime slurry in conventional manner. After 35 minutes, the neutralized slurry settled to about 50% of its original volume. Although sand was observed to have concentrated in the bottom area, no clearly defined layer of sand was identified and sand was distributed throughout, indicating high viscosity. The precipitate particles other than sand, were very fine (less than 5 microns in size).

The experiment was repeated with neutralization according to the present invention, using a lime slurry flocculated with 0.05% solution of E10 flocculant at a dosage of 200 g/ton of lime. After 35 minutes, the settled volume was about 30% of its original volume. Sand and precipitate particles formed two distinct layers, sand on the bottom with precipitate particles on top, indicating a much lower viscosity. The precipitate particles were also coarse and easily filterable.

It should be understood that this invention is by no means limited to the above embodiments and that many modifications and adaptations thereof will be readily apparent to a person skilled in the art and the scope of the invention should only be construed by reference to the appended claims.

I claim:

1. A method of performing precipitation reactions which yield precipitate particles in the form of flakes having cross-section measurements from about 10 to about 400 microns, from ions in solution which are precipitated by a sparingly soluble precipitant, and which comprise:
    a) selecting a precipitant for the ions to be precipitated;
    b) slurrying the precipitant to form a slurried precipitant;
    c) flocculating the precipitant with a flocculant to obtain discrete floccules having a diameter from about 1 to about 6 mm;
    d) adding the flocculated precipitant to the solution containing ions to be precipitated and agitating the same, whereby a layer of precipitates forms on the surface of the precipitant floccules where the concentration of precipitant ions is the highest, thereby at least partially encapsulating the precipitant floccules; and
    e) continuing agitation to cause the at least partially encapsulated floccules to break down, releasing flakes of precipitate formed from said ions in solution and said precipitant ions on the surface of said floccules, said flakes having cross-section measurements from about 10 to about 400 microns and exposing fresh uncoated surface of the precipitant floccules to allow continuation of the precipitation until all the precipitant is consumed or until the solution is stripped of ions to be precipitated.

2. Method according to claim 1, wherein the precipitant is hydrated lime.

3. Method according to claim 1, wherein the precipitant is selected from the group consisting of limestone, calcium phosphate, calcium sulphide or any compound which will react with the anions or cations in solution to form precipitates and which is sufficiently insoluble to form a slurry.

4. Method according to claim 1, wherein the flocculant is a polymer.

5. Method according to claim 4, wherein the polymer flocculant is a high molecular weight polyacrylamide.

6. Method according to claim 1, wherein the flocculant is used in the form of a dilute aqueous solution of 0.01% to 0.10% by weight, in amounts ranging from 50 to 1000 g/ton of precipitant.

7. Method according to claim 1, wherein a coagulant is also added to the slurried precipitant.

8. Method according to claim 7, wherein the coagulant is a metal salt.

9. Method according to claim 1, wherein the coagulant is used in amounts of 1 to 2% by weight of precipitant.

10. Method according to claim 1, wherein the ions to be precipitated from the solutions or slurries to be treated comprise anions selected from the group consisting of $SO_4$, $SO_3$, $CO_3$, and $PO_4$.

11. Method according to claim 1, wherein the ions to be precipitated from the solutions or slurries to be treated comprise cations selected from the group consisting of Cu, Pb, Zn, Fe, Ca and Mg.

12. Method according to claim 1, wherein the resulting precipitate is subjected to a liquid/solid separation to separate the precipitate and any other solids from the liquid.

13. Method according to claim 12, wherein prior to the liquid/solid separation, the resulting precipitate is flocculated and allowed to settle.

14. Method according to claim 13, wherein the same flocculant is used to flocculate both the slurried precipitant and the resulting precipitate.

* * * * *